United States Patent
Deshpande et al.

(10) Patent No.: US 6,850,953 B1
(45) Date of Patent: Feb. 1, 2005

(54) CREATING MULTIPLE SETS OF DATA BY SPAWNING A SECONDARY VIRTUAL MACHINE

(75) Inventors: Alka K. Deshpande, Westford, MA (US); William Edwards, Bedford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 618 days.

(21) Appl. No.: 09/645,110

(22) Filed: Aug. 23, 2000

Related U.S. Application Data

(60) Provisional application No. 60/150,467, filed on Aug. 23, 1999.

(51) Int. Cl.[7] .............................. G06F 17/00; G06F 7/00
(52) U.S. Cl. ................ 707/103 Y; 707/101; 707/104.1; 709/201
(58) Field of Search ............... 707/1–5, 10, 100–104.1; 709/201, 313

(56) References Cited

U.S. PATENT DOCUMENTS

| | | | | |
|---|---|---|---|---|
| 5,421,011 A | * | 5/1995 | Camillone et al. .......... 709/104 |
| 5,504,888 A | * | 4/1996 | Iwamoto et al. ............ 707/200 |
| 5,664,216 A | | 9/1997 | Blumenau .................... 345/302 |
| 5,774,551 A | * | 6/1998 | Wu et al. ..................... 713/155 |
| 5,796,396 A | | 8/1998 | Rich ........................... 345/332 |
| 5,886,697 A | * | 3/1999 | Naughton et al. .......... 345/473 |
| 5,900,869 A | | 5/1999 | Higashio ..................... 345/332 |
| 5,960,429 A | | 9/1999 | Peercy et al. .................. 707/5 |
| 6,038,562 A | * | 3/2000 | Anjur et al. ................... 707/10 |
| 6,085,198 A | * | 7/2000 | Skinner et al. ......... 707/103 R |
| 6,182,131 B1 | * | 1/2001 | Dean et al. .................. 709/222 |
| 6,243,832 B1 | * | 6/2001 | Eckes et al. ................... 714/33 |
| 6,259,448 B1 | * | 7/2001 | McNally et al. ............. 345/733 |
| 6,269,405 B1 | * | 7/2001 | Dutcher et al. ............. 709/248 |
| 6,300,936 B1 | | 10/2001 | Braun et al. ................ 345/156 |
| 6,324,543 B1 | * | 11/2001 | Cohen et al. ................ 707/200 |
| 6,384,869 B1 | | 5/2002 | Sciammarella et al. ..... 348/564 |
| 6,456,307 B1 | | 9/2002 | Bates et al. .................. 345/838 |
| 6,457,065 B1 | * | 9/2002 | Rich et al. ................... 709/328 |
| 6,486,893 B1 | | 11/2002 | Ramchandani et al. ..... 345/762 |
| 6,522,934 B1 | * | 2/2003 | Irwin et al. .................... 700/11 |
| 6,532,495 B1 | * | 3/2003 | Welles et al. ................ 709/232 |
| 2001/0056362 A1 | * | 12/2001 | Hanagan et al. ............... 705/7 |
| 2002/0019860 A1 | * | 2/2002 | Lee et al. .................... 709/220 |
| 2002/0069077 A1 | * | 6/2002 | Brophy et al. .................. 705/1 |

FOREIGN PATENT DOCUMENTS

GB    2273801 A  *  6/1994  .......... G06F/15/40

OTHER PUBLICATIONS

Rosenstein, M.A., D.E. Geer, Jr. and P.J. Levine "The Athena Service Management System", Proceedings of the USENIX Winter 1998 Technical Conference, pp. 203–212, 1988.*

(List continued on next page.)

*Primary Examiner*—Luke S Wassum
(74) *Attorney, Agent, or Firm*—Beyer Weaver & Thomas, LLP

(57) ABSTRACT

Methods, systems, and computer-readable media are disclosed for having a primary process spawn a secondary process to create multiple data sets, thereby allowing the primary process to continue performing other tasks or to terminate. The primary and secondary processes can be virtual machines, such as Java Virtual Machines running in a computer system. The primary process gathers the raw data used to create the multiple data sets and stores the data in a serialized object. The primary process also runs a script to spawn a secondary process which accepts the serialized object as input. The serialized object is then deserialized and the raw data is operated on by the secondary process without any interference from the primary process. The primary process, responsible for maintaining a GUI for the user, can perform other tasks or terminate without effecting the secondary process. Thus, a user of the primary process is free to continue using the GUI and perform other tasks while the multiple data sets are created by the secondary process in the background.

12 Claims, 9 Drawing Sheets

OTHER PUBLICATIONS

Durham, C.F., Jr. "Student Account Facility for the AIX Operating System on an IBM RT Computer", Master's Thesis, Texas A& University, Department of Computer Science, May 1990.*

Curry, D.A., S.D. Kimery, K.C. De La Croix and J.R. Schwab "ACMAINT: An Account Creation and Maintenance System for Distributed UNIX Systems", LISA IV, Oct. 17–19, 1990.*

Riddle, P., P. Danckaert and M. Metaferia "AGUS: An Automatic Multi–Platform Account Generation System", Proceedings of the 9th System Administration Conference (LISA '95), pp. 171–180, Sep. 17–22, 1995.*

Finke, J. "Institute White Pages as a System Administration Problem", Proceedings of the $10^{th}$ USENIX System Administration Conference (LISA X), pp. 233–238, Sep. 29–Oct. 4, 1996.*

* cited by examiner

CREATING MULTIPLE SETS OF DATA BY SPAWNING A SECONDARY VIRTUAL MACHINE

CROSS-REFERENCE TO RELATED APPLICATIONS

The present application claims priority from provisional patent application filed Aug. 23, 1999, Application No. 60/150,467, titled "Asynchronous Multi-User Add Process. The present application is also related to U.S. patent application Ser. No. 09/645,103, filed on Aug. 23, 2000, entitled "Method and System for Storing and Displaying Elements in Graphical User Interface", which is incorporated herein by reference.

BACKGROUND OF THE INVENTION

1. Field of the Invention

The present invention relates generally to computer systems and computer system application software. More specifically, it relates to system software intended to execute on computer networks for creating a high number of user data sets, such as user account information.

2. Discussion of Related Art

In many computer network environments, such as in universities, large corporations, or government entities, it is often necessary to create computer network accounts for new users. For example, when a new class of students joins a school or university, each student is typically assigned a computer network user account so they can logon and use the university computer system facilities. The same is true in numerous other settings in which hundreds or even thousands of users have to be assigned a user account on a computer system. In many instances, these new users are assigned user accounts at a particular time, e.g., at the end of the month or week, or at the beginning of a new semester.

The process for entering the data necessary for each user to create a new user account is typically slow, error-prone, and time-consuming. A system administrator (or someone working with the administrator) can enter data on each new user one at a time. This can take many hours once the number of new users gets to be significant, such as a hundred. Data items such as a user shell, a password, and so on need to be entered besides the new user name. In some cases scripts or other batch programs can be written to automate the process. However, this has also proven difficult in many instances since the basic new user data must still be entered one user at a time. The data must be entered into a file, typically without the help of a user interface.

Such scripts or batch programs also have the drawback of not allowing the system administrator to perform other tasks or jobs, or use other tools, while the process is creating the new accounts. In other words, the process, such as a virtual machine, is not free to perform other functions. The system administrator must wait for the process of creating new user accounts to finish.

Problems also arise if a separate thread is used to process the creation of new user accounts. It has been shown that when a thread in a virtual machine is used to create multiple user accounts, both the GUI associated with the user account creation tool and the thread are terminated if the system administrator exits the virtual machine. In addition, by using a thread, once a system administrator or user exits the main thread that is doing all the processing, a second thread spawned from the main thread to perform the user account creation would have been exited as well, i.e., it would have died as well.

Therefore, it would be desirable to have a process in which a system administrator can create a high volume of user accounts in a computer network in an efficient manner. It would be desirable if the system administrator could use a GUI to enter the information on a new user, thereby speeding up the process of entering the user information. It would also be desirable to enable the system administrator to use other tools or perform other tasks while the new user accounts are being created instead of the user account creation time being down time for the administrator.

SUMMARY OF THE INVENTION

To achieve the foregoing, methods, systems, and computer-readable media are disclosed which provide a way for creating or generating multiple user data sets in a secondary process spawned from an initial process, where the secondary process uses a serialized data object created by the initial process. In one aspect of the invention, a method of running a primary process in a computer system having a graphical user interface (GUI) to create multiple data sets is described. A set of raw data, such as user account information, is received at the primary process, such as a Java Virtual Machine (JVM). The raw data is stored in the form of a serialized object by the primary process. The primary process then spawns or creates a secondary process which accepts as input the serialized object. The secondary process deserializes the object and accesses the raw data. The secondary process and the deserialized object are then disassociated from the primary process, which continues to execute the GUI and is free to perform other functions, or terminate. Doing so does not effect the execution of the secondary process, which can also be a JVM. The secondary process generates the multiple data sets using the data in the deserialized object and does so transparently to users of the primary process; that is, in the background.

In one embodiment of the present invention, the primary and secondary processes are JVMs and the serialized object is created and deserialized using Java APIs. In another embodiment, the deserialized object is discarded once the secondary process has created the multiple data sets. In yet another embodiment of the present invention, the secondary process invokes the computer instructions or code to process the raw data in the deserialized object regardless of the state of the primary process. That is, the primary process can be idle, performing other tasks (e.g., via the GUI), or be terminated. In yet another embodiment, the secondary process is terminated when the multiple data sets are created and an activity log has been created.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment; it will be understood that it is not intended to limit the invention to one preferred embodiment. To the contrary, it is intended to cover alternatives, modifications, and equivalents as may be included within the spirit and scope of the invention as defined by the appended claims.

A process of creating multiple user accounts or other types of data sets in a computer network environment using a GUI and allowing a system administrator to use other tools during creation time is described in the various figures. Once the user accounts or other types of data sets have been created, they can be represented graphically using icons on a display screen in an efficient manner. A user or system administrator can scroll through hundreds or thousands of labelled icons representing each user account (or any other type of discrete data set, application, host name, etc.) and select one or more of them by highlighting the icons and then viewing information underlying the icon, if desired.

In the present invention, a secondary virtual machine is spawned to create the multiple user accounts thereby leaving the primary virtual machine free so the system administrator can use other tools and, significantly, the associated GUI, or simply exit the primary virtual machine. In the described embodiment, the secondary virtual machine is created exclusively for the creation of the user accounts and is exited or destroyed once the process is complete. During this time, a system administrator can perform other tasks. Thus, the user account creation process is made more efficient by presenting a GUI to the administrator allowing him or her to enter new user account data and to perform other tasks while the accounts are being created, thereby minimizing the downtime for the administrator.

Figure 1:
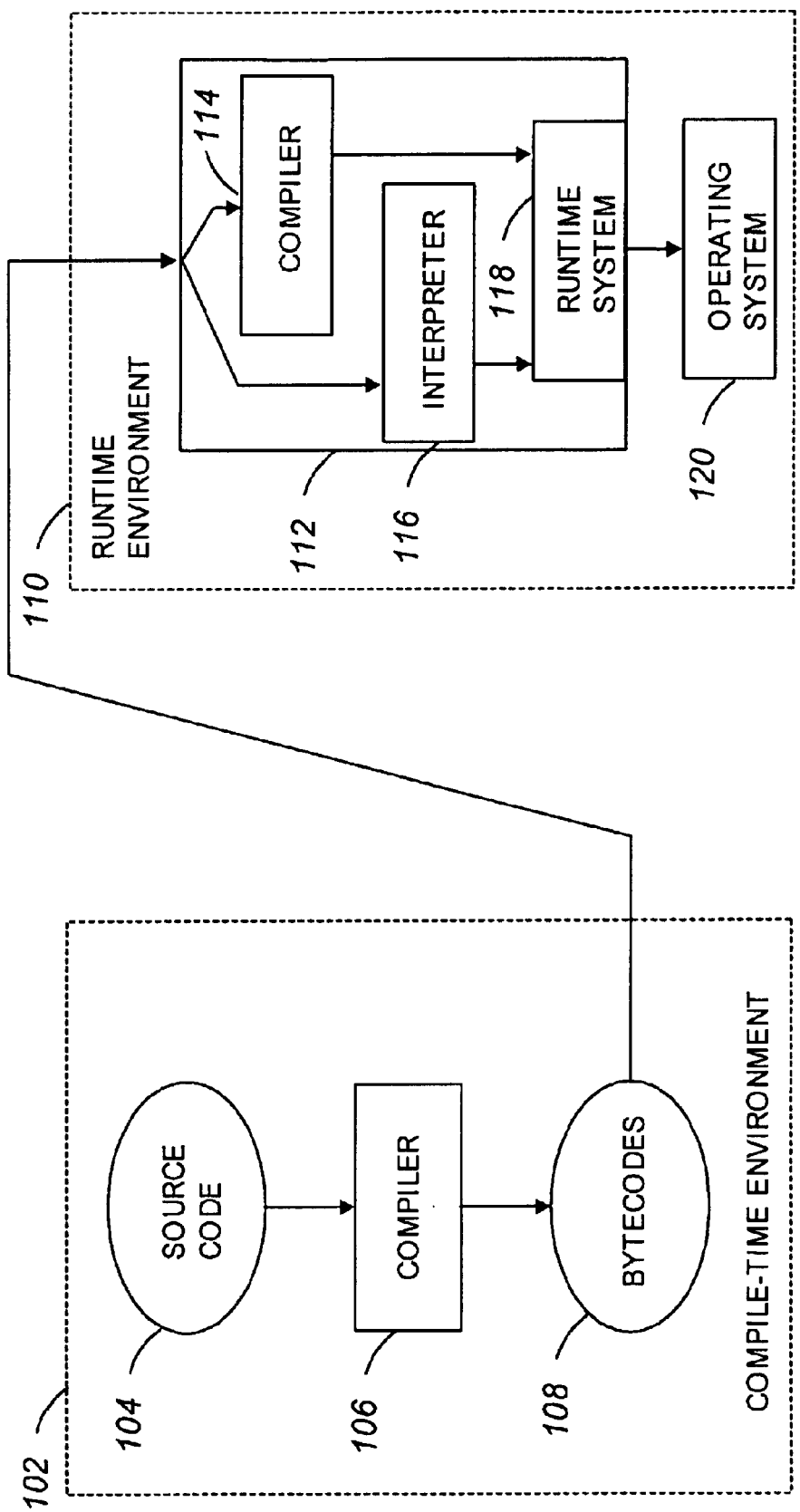
FIG. 1 is a diagrammatic representation of a virtual machine suitable for implementing the present invention.

Before describing the process and system of the present invention in detail, it is useful to describe the processes and components of a Java Virtual Machine ("JVM"). In the described embodiment, a secondary JVM is spawned to create the new user accounts. This second JVM acts on a serialized data object that contains all the user account information, described in greater detail below. Thus, the primary JVM is free to perform other tasks. FIG. 1 is a diagrammatic representation of a virtual machine suitable for implementing the present invention. It should be noted that not all the components or processes described in FIG. 1 maybe used by the present invention, but are provided for completeness.

When a computer program, e.g., a computer program written in the Java™ programming language, is executed, source code 104 is provided to a compiler 106 within compile-time environment 102. Compiler 106 translates source code 104 into bytecodes 108. In general, source code 104 is translated into bytecodes 108 at the time source code 104 is created by a software developer.

Bytecodes 108 may generally be reproduced, downloaded, or otherwise distributed through a network or stored on a storage device. In the described embodiment, bytecodes 108 are platform independent. That is, bytecodes 108 may be executed on substantially any computer system that is running on a suitable virtual machine 112.

Bytecodes 108 are provided to a runtime environment 110 which includes virtual machine 112. Runtime environment 110 may generally be executed using a processor or processors. Virtual machine 112 includes a compiler 114, an interpreter 116, and a runtime system 118. Bytecodes 108 may be provided either to compiler 114 or interpreter 116.

When bytecodes 108 are provided to compiler 114, methods contained in bytecodes 108 are compiled into machine instructions. In one embodiment, compiler 114 is a just-in-time compiler which delays the compilation of methods contained in bytecodes 108 until the methods are about to be executed. When bytecodes 108 are provided to interpreter 1116, bytecodes 108 are read into interpreter 116 one bytecode at a time. Interpreter 116 then performs the operation defined by each bytecode as each bytecode is read into interpreter 116. That is, interpreter 116 "interprets" bytecodes 108, as will be appreciated by those skilled in the art. In general, interpreter 116 processes bytecodes 108 and performs operations associated with bytecodes 108 substantially continuously.

When a method is invoked by another method, or is invoked from runtime environment 110, if the method is interpreted, runtime system 118 may obtain the method from runtime environment 110 in the form of a sequence of bytecodes 108, which may be directly executed by interpreter 116. If, on the other hand, the method which is invoked is a compiled method which has not been compiled, runtime system 118 also obtains the method from runtime environment 110 in the form of a sequence of bytecodes 108, then may go on to activate compiler 114. Compiler 114 then generates machine instructions from bytecodes 108, and the resulting machine-language instructions may be executed directly by one or more processors. In general, the machine-language instructions are discarded when virtual machine 112 terminates. The operation of virtual machines or, more particularly, the JVM, is described in more detail in *The Java™ Virtual Machine Specification* by Tim Lindholm and Frank Yellin (ISBN 0-201-63452-X), which is incorporated herein by reference.

Figure 2:
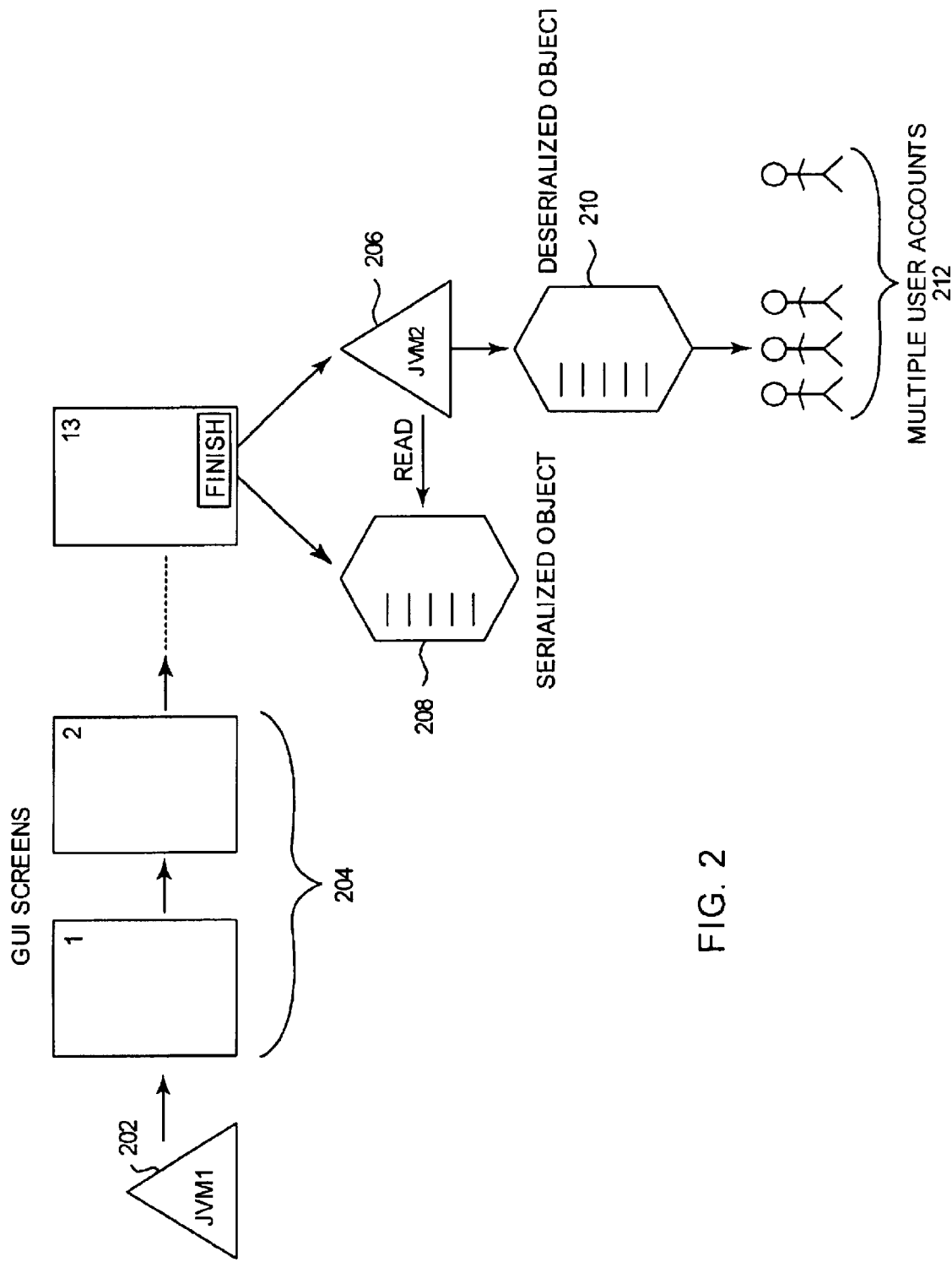
FIG. 2 is a block diagram of a process for creating multiple user accounts in accordance with one embodiment of the present invention.

FIG. 2 is a block diagram of a process for creating multiple user accounts in accordance with one embodiment of the present invention. A currently running JVM 202 executing a main process generates a series of screens 204 which comprise the GUI. JVM 202 also runs the backend server for processing the data entered. In the described embodiment there are 13 screens a user can complete for entering the necessary user account information. Various methods of entering user name data are described below. Once the user is done entering all the data, the user submits the data to JVM 202. Once this is done, a second JVM 206 is spawned representing a second process. In addition, all the data submitted by the user is collected as a serialized object 208. This serialized object is described in greater detail in FIG. 3. JVM 206 reads serialized object 208 and processes the object thereby creating a deserialized object 210. From deserialized object 210, a series of user accounts 212 is created. This process is described in further detail in the figures below.

Figure 3:
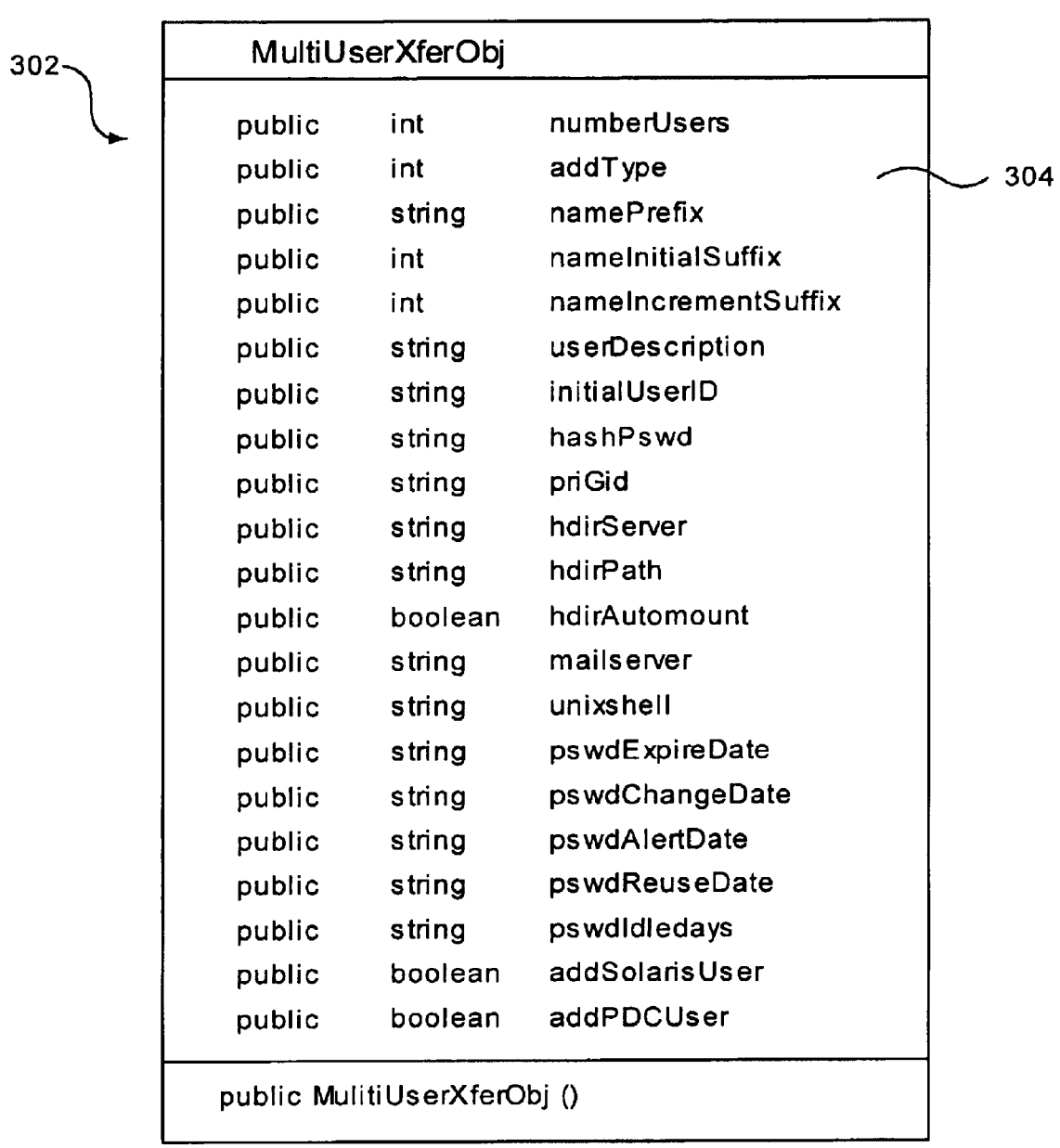
FIG. 3 is a block diagram of a serializable object in accordance with one embodiment of the present invention.

FIG. 3 is a block diagram of a serializable object in accordance with one embodiment of the present invention. The Java Development Kit supports an object serialization API. Object serialization allows a developer to make applications more transient in that the code as well as the data can be moved or transferred easily. Serialization is a mechanism for transforming an object into streams of bytes and then reconstituting the stream of bytes back into the object, also known as deserialization. In the Java language, any object that implements the java.io.Serializable interface can be turned into a stream of bytes and then later reconstituted. The Serializable interface does not add any methods that need to be implemented; it is a "tagging" interface that can be used as an indication to a JVM that the developer wants a given class to be serialized. Primitive types such as int, boolean, and so on are considered to be serializable. Object serialization is being used in the described embodiment of the present invention to store the object in a particular state, and then later reconstruct it when needed. FIG. 3 is a class diagram of a serialized object called MultiUserXferObj in the described embodiment that contains a set of public attributes and a method. In other preferred embodiments, the name of the object and the number of attributes and methods can differ depending on how the serialized object is being used. It represents an object or instance of the data transferred from one JVM to another for a multiple user batch operation described below. An object in the class contains information input through the GUI for creating multiple user accounts. The object is serialized and written to a file. The serialized object file is read by a multi-user class and used to create an instance of the class for adding each new user account.

Figure 4A:
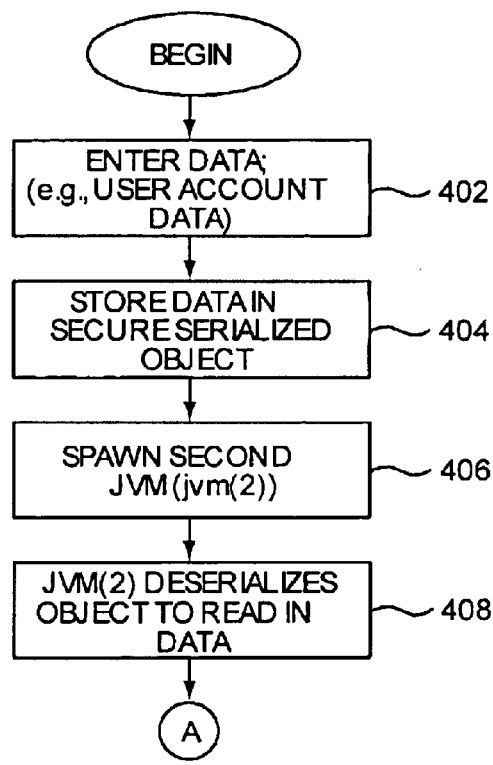
FIGS. 4A and 4B are overview flow diagrams of a process for creating multiple user accounts in a computer system in accordance with one embodiment of the present invention.
Figure 4B:
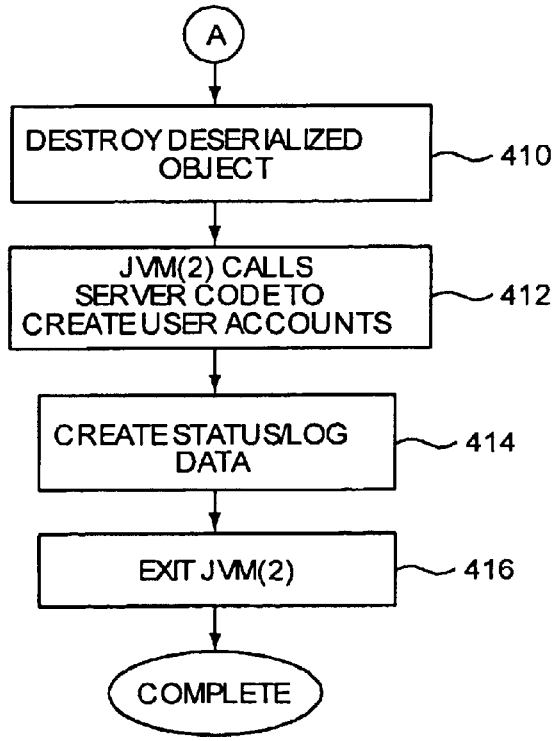

A serialized object, such as object 208 in FIG. 2, has a corresponding class diagram 302. A brief description of each of the public attributes 304 including their type, is provided below.

int numberUsers: Total number of user accounts (or data sets, applications, hosts, etc.) to be created;

int addType: Type of input, e.g., automatic name generation, file containing user name list, etc.;

string namePrefix: Prefix to be used if user account name is generated automatically;

int nameInitialSuffix: Initial suffix if automatic generation of user name accounts is performed;

int nameIncrementSuffix: Increment value if automatic generation of user name accounts is performed;

string userDescription: User account description;

string initialUserId: Initial user identifier (all subsequent user identifiers are generated beginning with initialUserId);

string hashPswd: Password of the new user accounts;

string priGid: Primary group identifier for new user accounts;

string hdirServer: Home directory server (the home directory location of all new user accounts being created);

string hdirPath: Path name for the home directory;

boolean hdirAutomount: Whether the home directory of the new user accounts should be automounted;

string mailServer: Mailserver of the new user accounts;

string unixShell: Default shell for the new user accounts;

string pswdExpireDate: Password expiration date;

string pswdChangeDays: Number of days after which passwords should be changed;

string pswdAlertDays: Number of days after which the user is to be alterted about the password change;

string pswdReuseDays: Number of days in which passwords can be reused;

string pswdIdleDays: Number of days passwords can be idle;

boolean addSolarisUser: Whether a Solaris user should be added;

boolean addPDCUser: Whether a PDCUser should be added (PDCUser is a Windows NT® emulation of a Solaris user);

FIGS. 4A and 4B are overview flow diagrams of a process for creating multiple user accounts in a computer system in accordance with one embodiment of the present invention. In the described embodiment, the process described is used to create user accounts. In another preferred embodiment, the process can be used to create multiple data sets containing data other than data comprising user accounts. For example, the process can be used to create multiple patches or software fixes on a system or creating multiple hosts or IP-addressable nodes. At step 402 the user account data used to create the user accounts is entered. In the described embodiment, this data is entered via a series of screens 204 of FIG. 2 that comprise a GUI for the present invention. This data includes the users' names, account information, logon shell, passwords, password options, primary groups, home directories, and so on. In other preferred embodiments, other types of data may be entered depending on the context in which the process is being used.

In the described embodiment, there are numerous ways user names can be entered. One is entering a file name of a file that contains a series of user names that was previously created. Another method is specifying 1) the number of user accounts that need to be created; 2) a prefix for all user names (e.g., stu or dev); and 3) a starting number or identifier. Using this method a series of user names will be created in the format: [prefix][number/identifier]. Finally, the user name can be entered manually by the system administrator.

Once all the data are entered, the system administrator submits the data thereby storing the data in a secure serialized object at a step 404. What constitutes all the data will depend on the context in which the present invention is being used. The examples described here are data for creating multiple user accounts. Other types of multiple data sets can be created using the processes of the present invention. In the described embodiment, the data is secure in that it is encrypted using one of numerous well known encryption methods. In other preferred embodiments, the data does not have to be encrypted. As is well known in the field of Java programming, Java processes and JVMs process serialized objects. Also well known in the field, objects of a particular class to be serialized must meet some some requirements. Although the class may implement a serializable interface, there are things the class can do to prevent objects from being serialized. To avoid these preventive measures, the class must ensure that it has a public "no-argument" constructor. This constructor is needed by an object in the class for the object to be properly deserialized. In addition, the class cannot contain any references to objects that are themselves not serializable. If the virtual machine being used is not a JVM, data object 208 does not have to be serialized.

At a step 406 a second JVM is spawned. This is done by a script in the first JVM immediately after the secure, serialized data object is created. Methods for creating a second JVM, representing a second process, are well known in field. This process is described in greater detail in FIG. 6.

At a step 408 the second JVM deserializes the serialized data object by reading the object. More specifically, in the described embodiment, the MultiUser class deserializes the serialized object, MultiUserXferObj, and retrieves all the necessary data used to create the user accounts. By deserializing the data object, the second JVM can read the data entered by the system administrator. At a step 410 the deserialized object is discarded since it is no longer needed. At a step 412 the second JVM invokes server code to create the user accounts. It does so by calling the back-end (server) code to create the user accounts. In other preferred embodiments, the appropriate back-end code is called to create the multiple data sets. For creating the multiple user accounts, the second JVM uses existing classes as would normally be used by the first or primary JVM.

At a step 414, the second JVM creates status and log data reflecting what had transpired while the second JVM was running. This data includes, for example, the number of accounts created, status data, and success and failure rates. This log data is then used as input to a log viewer application which reads the data. Once this is done, the second JVM is discontinued or is exited by the computer system at a step 416. This can be done using well known Java API. The second JVM is spawned exclusively for creating the multiple user accounts, performed at step 412. Once the second JVM is created and processing the data, the first JVM can continue accepting input from the user or be terminated. Once the process by the second JVM is done, the second JVM is eliminated.

Figure 5:
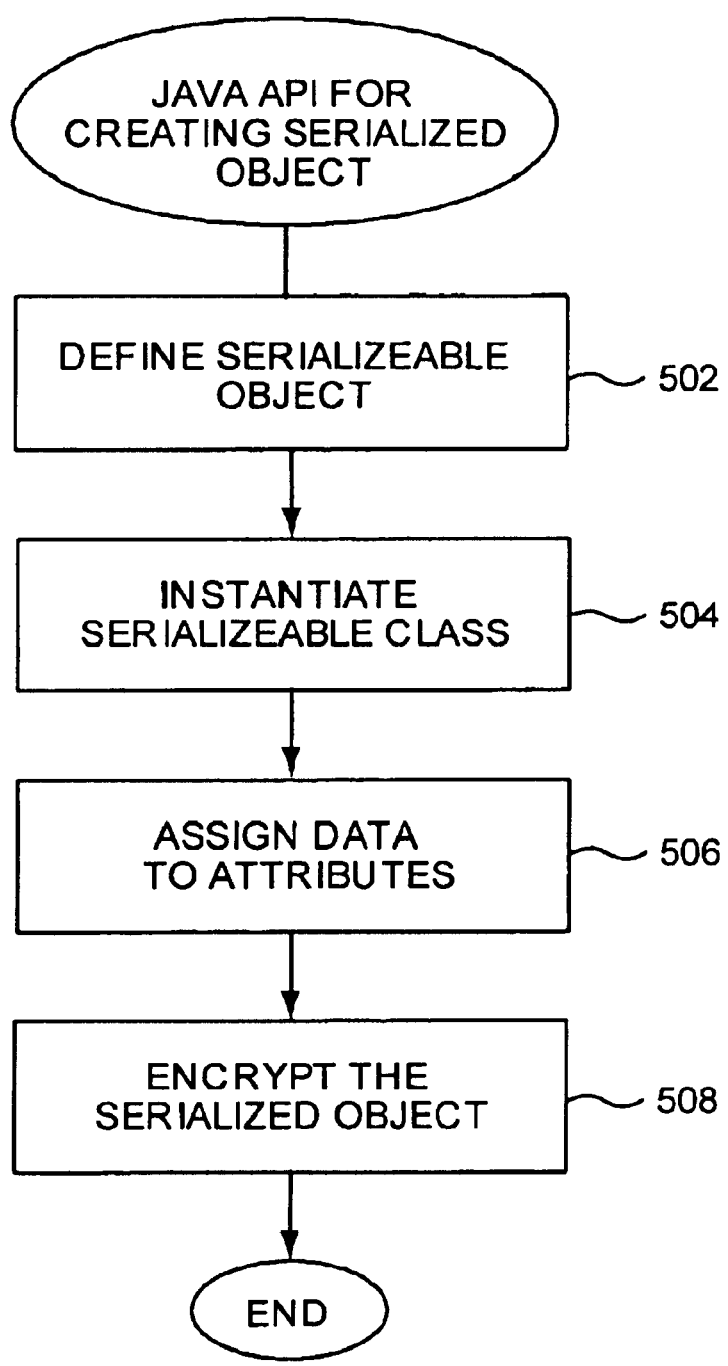
FIG. 5 is a flow diagram of a process for invoking an API for creating a serializable object in accordance with one embodiment of the present invention.

FIG. 5 is a flow diagram of a process for invoking an API for creating a serializable object in accordance with one embodiment of the present invention. As is known in the field of Java programming, a Java API is available for creating a serialized object from a serializable class. At some point prior to instantiating a serializable class, the class must be defined or created. This is shown at step 502. At step 502 a serializable object is created by the first JVM and stored in memory. Part of defining this class is defining the attributes of the class, such as name, user id, and password. These attributes are described in FIG. 3 for creation of user accounts. In other preferred embodiments, different attributes can be used to define the class.

At step 504 a serializable class is instantiated or invoked, thereby creating an object. The object defined in step 502 becomes a live object having all the attributes specified when the class was defined. At step 506 data are associated or assigned to the specific attributes. In the described embodiment, data for the serialized object are obtained by one of the several methods of data collection described in step 402 of FIG. 4A. Briefly, this information, such as user identifiers or user names, can be entered through a file, manually, or by automatically generating a series of user names. Other data such as passwords and login shells are assigned to the appropriate attributes. At step 508 the serialized object is encrypted. In other preferred embodiments, this step can be avoided. In the described embodiment, all these steps are performed on the first JVM.

Figure 6:
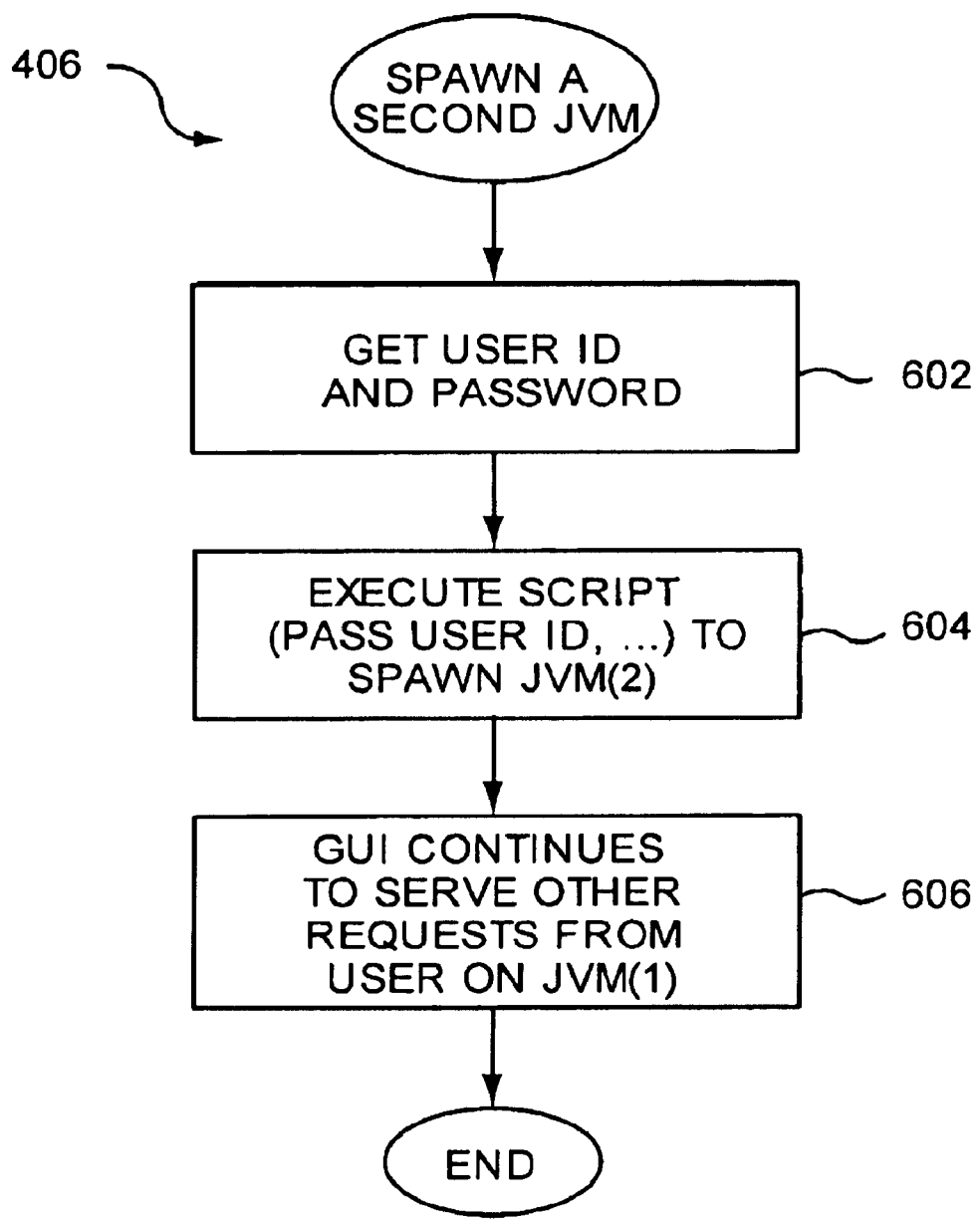
FIG. 6 is a flow diagram of a process for spawning a second JVM in accordance with one embodiment of the present invention.

FIG. 6 is a flow diagram of a process for spawning a second JVM in accordance with one embodiment of the present invention. It describes in greater detail step 406 of FIG. 4. The generic process of spawning a JVM is well-known in the field of Java programming. At step 602 the first JVM retrieves the data necessary to run a script, such as a user id and password in the described embodiment. At step 604 the script is executed using the data obtained in step 602 as parameters and spawns a second JVM. Spawning a second JVM in this case is preferable over using threads as described above. When spawning another JVM, the user logged in for the previous JVM is re-authorized and authenticated. In the described embodiment, a class representing a GUI wizard, called AdminMultiUserWiz.java, has a method referred to as doFinish. This method serializes the attribute data described above and puts it into a MultiUserXfer object in the described embodiment. The doFinish method then runs a script which invokes a new JVM. This second JVM is a runtime environment for running any Java program. In the new JVM, a class called AsyncMultiUser class, having a main ( ) method, is instantiated. AsyncMultiUser class, in turn, invokes a class referred to as MultiUser, which creates the user accounts on the specified host. The AsyncMultiUser class obtains all the necessary information about the system administrator (e.g., user ID, password, etc.) who wants to create the new user accounts from an umbrella application. The domain in which the user account creation will occur (i.e., management scope) is obtained by AsyncMultiUser class.

Once the second JVM is spawned and processing the necessary data for creating the user accounts, the GUI of the first JVM continues to serve other requests from the user at step 606, thereby allowing the system administrator to continue entering information or using the first JVM for other processes or terminating it.

Figure 7:
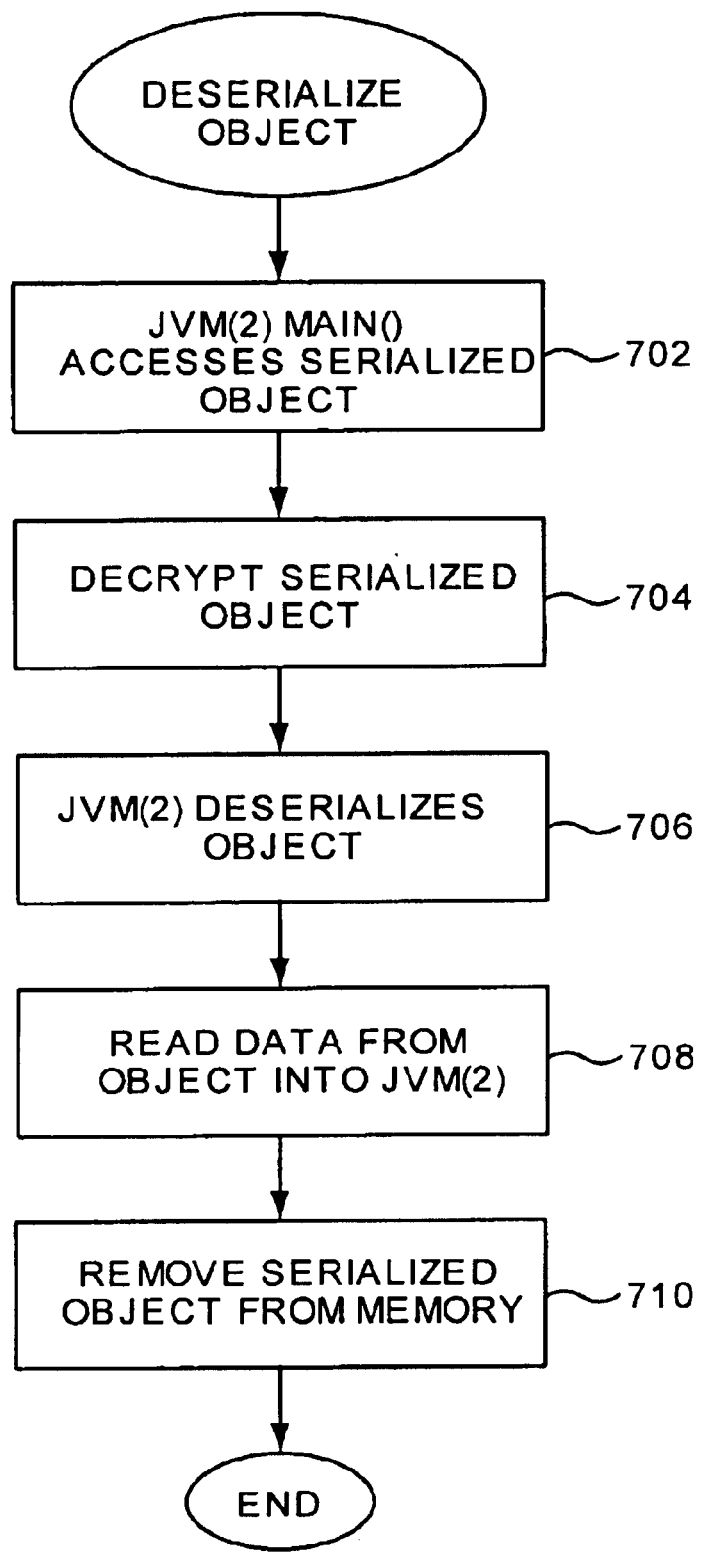
FIG. 7 is a flow diagram of a process for deserializing a data object in accordance with one embodiment of the present invention.

FIG. 7 is a flow diagram of a process for deserializing a data object in accordance with one embodiment of the present invention. As described above, the second JVM, and more specifically the main ( ) routine of the second JVM accesses the serialized object containing all the necessary data for creating the user accounts and is stored in memory. This is done at step 702. At step 704 the serialized object is decrypted so the second JVM can access the internal data. In other preferred embodiments, the serialized object may not need to be encrypted and this step can be avoided.

At step 706 the second JVM deserializes the object. A process of deserializing an object is well known in the field. Once the object is deserialized, the second JVM can read in and begin processing the data at step 708. One example of processing the data is described in FIG. 8 below. At step 710, once all the data has been read by the second JVM, the serialized object is no longer needed and removed from memory.

Figure 8:
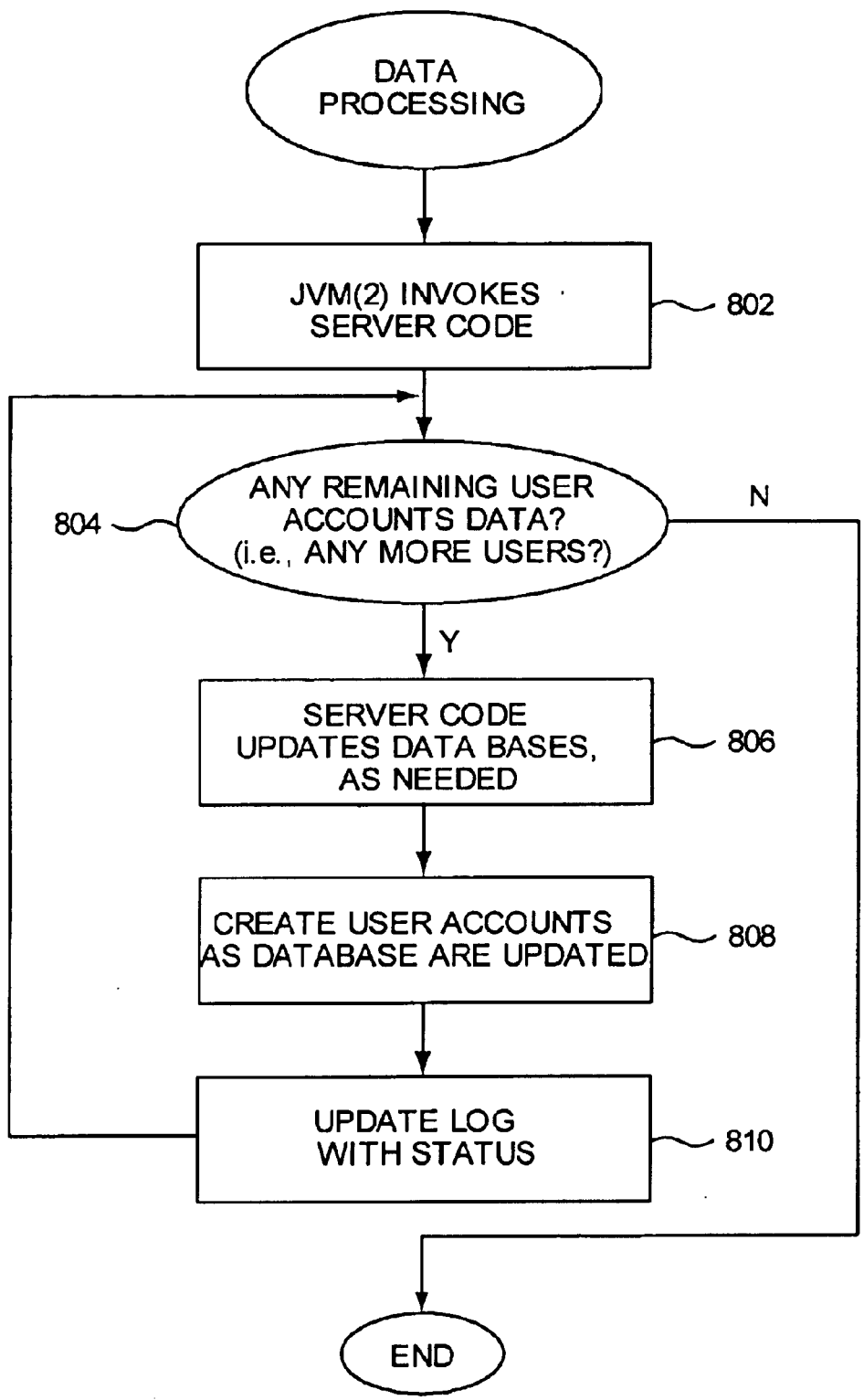
FIG. 8 is a flow diagram of a process for creating user accounts from specific user data in accordance with one embodiment of the present invention.

FIG. 8 is a flow diagram of a process for creating user accounts from specific user data in accordance with one embodiment of the present invention. At step 802 the second JVM invokes the server code needed for processing the data. This is essentially the same server code that would have executed on the first JVM to create one or more user accounts. At step 804 the second JVM determines whether there are any remaining user account data. In other preferred embodiments, the server code can be used to perform any function required by the system administrator or user. If there is more user data to be processed, control goes to step 806. At step 806 the server code processes the data and updates the appropriate databases as needed. At step 808 the server code creates the user accounts or other data sets as the databases are updated. At step 810 the system logs are updated with all activity, e.g., if there is a failure in creating a user account, as would normally be done if the processing all occurred on the first JVM. Control then returns to step 804 where the second JVM checks whether there is any remaining data. If not, the process is complete and all the user accounts have been created without locking up the first JVM, thereby allowing the first JVM to continue processing or shutdown.

The present invention employs various computer-implemented operations involving data stored in computer systems. For example, the first and second JVMs are processes executing on data stored in physical computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 9:
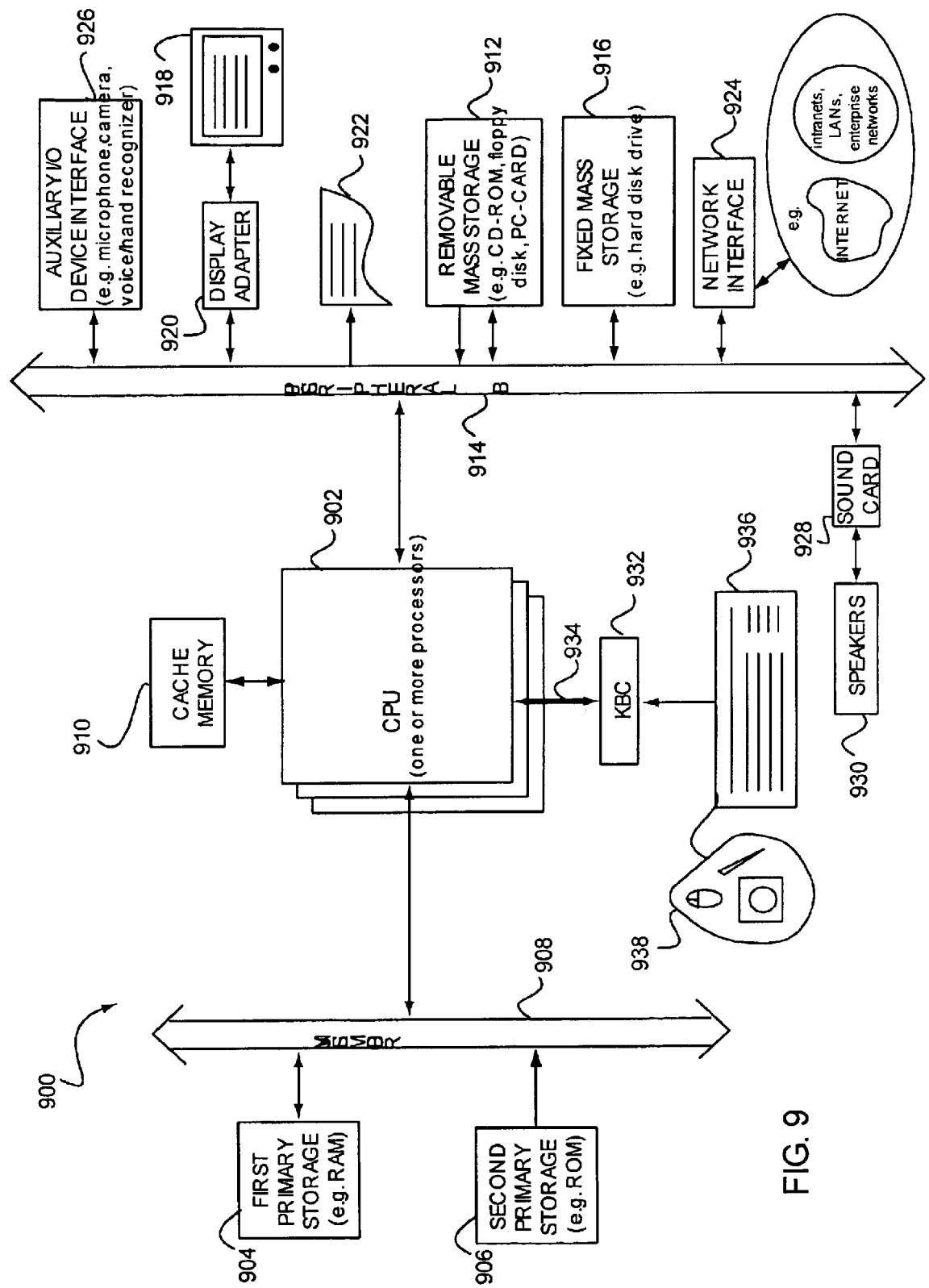
FIG. 9 is a block diagram of a general purpose computer system 100 suitable for carrying out the processing in accordance with one embodiment of the present invention.

FIG. 9 is a block diagram of a general purpose computer system 900 suitable for carrying out the processing in accordance with one embodiment of the present invention. FIG. 9 illustrates one embodiment of a general purpose computer system. Other computer system architectures and configurations can be used for carrying out the processing of the present invention. Computer system 900, made up of various subsystems described below, includes at least one microprocessor subsystem (also referred to as a central processing unit, or CPU) 902. That is, CPU 902 can be implemented by a single-chip processor or by multiple processors. It should be noted that in re-configurable computing systems, CPU 902 can be distributed amongst a group of programmable logic devices. In such a system, the programmable logic devices can be reconfigured as needed to control the operation of computer system 900. In this way, the manipulation of input data is distributed amongst the group of programmable logic devices. CPU 902 is a general purpose digital processor which controls the operation of the computer system 900. Using instructions retrieved from memory, the CPU 902 controls the reception and manipulation of input data, and the output and display of data on output devices.

CPU 902 is coupled bi-directionally with a first primary storage 904, typically a random access memory (RAM), and uni-directionally with a second primary storage area 906, typically a read-only memory (ROM), via a memory bus 908. As is well known in the art, primary storage 904 can be used as a general storage area and as scratch-pad memory, and can also be used to store input data and processed data. It can also store programming instructions and data, for example, in the form of a serialized data object, in addition to other data and instructions for processes operating on CPU 902, and is used typically for fast transfer of data and instructions in a bi-directional manner over the memory bus 908. Also as well known in the art, primary storage 906 typically includes basic operating instructions, program code, data and objects used by the CPU 902 to perform its functions. Primary storage devices 904 and 906 may include any suitable computer-readable storage media, described below, depending on whether, for example, data access needs to be bi-directional or uni-directional. CPU 902 can also directly and very rapidly retrieve and store frequently needed data in a cache memory 910.

A removable mass storage device 912 provides additional data storage capacity for the computer system 900, and is coupled either bi-directionally or uni-directionally to CPU 902 via a peripheral bus 914. For example, a specific removable mass storage device commonly known as a CD-ROM typically passes data uni-directionally to the CPU 902, whereas a floppy disk can pass data bi-directionally to the CPU 902. Storage 912 may also include computer-readable media such as magnetic tape, flash memory, signals embodied on a carrier wave, PC-CARDS, portable mass storage devices, holographic storage devices, and other storage devices. A fixed mass storage 916 also provides additional data storage capacity and is coupled bi-directionally to CPU 902 via peripheral bus 914. The most common example of mass storage 916 is a hard disk drive. Generally, access to these media is slower than access to primary storages 904 and 906.

Mass storage 912 and 916 generally store additional programming instructions, data, and the like that typically are not in active use by the CPU 902. It will be appreciated that the information retained within mass storage 912 and 916 may be incorporated, if needed, in standard fashion as part of primary storage 904 (e.g. RAM) as virtual memory.

In addition to providing CPU 902 access to storage subsystems, the peripheral bus 914 is used to provide access other subsystems and devices as well. In the described embodiment, these include a display monitor 918 and adapter 920, a printer device 922, a network interface 924, an auxiliary input/output device interface 926, a sound card 928 and speakers 930, and other subsystems as needed.

The network interface 924 allows CPU 902 to be coupled to another computer, computer network, or telecommunications network using a network connection as shown. Through the network interface 924, it is contemplated that the CPU 902 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 902 can be used to connect the computer system 900 to an external network and transfer data according to standard protocols. That is, method embodiments of the present invention may execute solely upon CPU 902, or may be performed across a network such as the Internet, intranet networks, or local area networks, in conjunction with a remote CPU that shares a portion of the processing. Additional mass storage devices (not shown) may also be connected to CPU 902 through network interface 924.

Auxiliary I/O device interface 926 represents general and customized interfaces that allow the CPU 902 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 902 is a keyboard controller 932 via a local bus 934 for receiving input from a keyboard 936 or a pointer device 938, and sending decoded symbols from the keyboard 936 or pointer device 938 to the CPU 902. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 908, peripheral bus 914, and local bus 934 are illustrative of any interconnection scheme serving to link the subsystems. For example, a local bus could be used to connect the CPU to fixed mass storage 916 and display adapter 920. The computer system shown in FIG. 9 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, although the virtual machines described operate in a Java programming environment, VMs of other types operating in various programming environments can be used to create the multiple data sets. In another example, although a serialized object instantiated from a serializable class has been described, other types and forms of data storage and formats can be used for different types of virtual machines. Accordingly, the present embodiments are to be considered as illustrative and not restrictive, and the invention is not to be limited to the details given herein, but may be modified within the scope and equivalents of the appended claims.

What is claimed is:

1. In a computer device having a graphical user interface executing on a first virtual machine, a method of generating multiple data sets, the method comprising:

receiving a raw data set at the first virtual machine in the computer device, the raw data set being received through the graphical user interface;

defining a serializable class having multiple attributes;

instantiating a serialized object from the serializable class;

assigning the raw data to the multiple attributes to create a serialized object storing the raw data set;

invoking a script, at the first virtual machine to create a second virtual machine in the computer device, wherein creator data used to create the first virtual machine is used to create the second virtual machine;

deserializing the serialized object at the second virtual machine thereby generating a deserialized object;

disassociating the deserialized object and the second virtual machine from the first virtual machine and the graphical user interface; and invoking computer instructions at the second virtual machine for operating on the deserialized object and generate multiple data sets from the deserialized object in a transparent manner, while the first virtual machine continues executing the graphical user interface.

2. A method as recited in claim 1 further comprising using a Java API to create the serialized object at the first virtual machine.

3. A method as recited in claim 1 wherein deserializing the serialized object at the second virtual machine further includes invoking a second Java API to deserialize the serialized object.

4. A method as recited in claim 1 further comprising creating a status log for tacking the creation of the multiple data sets.

5. A method as recited in claim 1 wherein the first virtual machine and the second virtual machine run in a Java operating environment.

6. A method as recited in claim 1 wherein the multiple data sets are multiple user account data sets.

7. A method as recited in claim 1 further comprising encrypting the serialized object at the first virtual machine.

8. A method as recited in claim 1 further comprising utilizing the first virtual machine while the second virtual machine operates on the serialized object.

9. A method as recited in claim 1 wherein the second virtual machine continues executing after the first virtual machine has been terminated.

10. A computer-readable medium containing programmed instructions arranged to generate multiple data sets in a computer device having a graphical user interface executing on a first virtual machine, the computer-readable medium including programmed instructions for:

receiving a raw data set at the first virtual machine in the computer device, the raw data set being received through the graphical user interface;

defining a serializable class having multiple attributes;

instantiating a serialized object from the serializable class;

assigning the raw data to the multiple attributes to create a serialized object storing the raw data set;

invoking a script at the first virtual machine to create a second virtual machine in the computer device, wherein creator data used to create the first virtual machine is used to create the second virtual machine;

deserializing the serialized object at the second virtual machine thereby generating a deserialized object;

disassociating the deserialized object and the second virtual machine from the first virtual machine and the graphical user interface; and invoking computer instructions at the second virtual machine for operating on the deserialized object and generate multiple data sets from the deserialized object in a transparent manner, while the first virtual machine continues executing the graphical user interface.

11. A computer-readable medium as recited in claim 10 further comprising programmed instructions for utilizing the first virtual machine while the second virtual machine operates on the serialized object.

12. A device for generating multiple data sets, the device having a graphical user interface executing on a first virtual machine, comprising:

a processor; and a computer-readable medium storing a program for execution by the processor, the program comprising:

computer code that receives a raw data set at the first virtual machine in the computer device, the raw data set being received through the graphical user interface;

computer code that defines a serializable class having multiple attributes;

computer code that instantiates a serialized object from the serializable class;

computer code that assigns the raw data to the multiple attributes to create a serialized object storing the raw data set;

computer code that invokes a script at the first virtual machine to create a second virtual machine in the computer device, wherein creator data used to create the first virtual machine is used to create the second virtual machine;

computer code that deserializes the serialized object at the second virtual machine thereby generating a deserialized object;

computer code that disassociates the deserialized object and the second virtual machine from the first virtual machine and the graphical user interface; and computer code that invokes computer instructions at the second virtual machine for operating on the deserialized object and generate multiple data sets from the deserialized object in a transparent manner, while the first virtual machine continues executing the graphical user interface.

\* \* \* \* \*